US012601394B2

(12) United States Patent
Wang et al.

(10) Patent No.: US 12,601,394 B2
(45) Date of Patent: Apr. 14, 2026

(54) SEALING ASSEMBLY, HYDRAULIC TORQUE CONVERTER AND VEHICLE

(71) Applicant: VALEO KAPEC TORQUE CONVERTERS (NANJING) CO., LTD., Nanjing (CN)

(72) Inventors: Zizhu Wang, Nanjing (CN); Xun Hu, Nanjing (CN); Zane Yang, Nanjing (CN); Cong Yin, Nanjing (CN)

(73) Assignee: VALEO KAPEC TORQUE CONVERTERS (NANJING) CO., LTD., Nanjing (CN)

( * ) Notice: Subject to any disclaimer, the term of this patent is extended or adjusted under 35 U.S.C. 154(b) by 0 days.

(21) Appl. No.: 19/035,021

(22) Filed: Jan. 23, 2025

(65) Prior Publication Data

US 2025/0320911 A1      Oct. 16, 2025

(30) Foreign Application Priority Data

Jan. 23, 2024  (CN) .......................... 202410095981.6
Jan. 23, 2024  (CN) .......................... 202420170047.1

(51) Int. Cl.
    *F16H 41/24*       (2006.01)
    *F16H 57/04*       (2010.01)

(52) U.S. Cl.
    CPC ......... *F16H 41/24* (2013.01); *F16H 57/0454* (2013.01)

(58) Field of Classification Search
    CPC ....... F16H 41/24; F16H 57/0454; F16D 41/06
    See application file for complete search history.

(56) References Cited

U.S. PATENT DOCUMENTS

| | | | |
|---|---|---|---|
| 2018/0031099 A1* | 2/2018 | Verhoog | ................. F16H 45/02 |
| 2018/0172127 A1* | 6/2018 | Depraete | ................. F16H 45/02 |
| 2019/0072165 A1* | 3/2019 | Yin | ......................... F16H 45/02 |

* cited by examiner

*Primary Examiner* — Abiy Teka
(74) *Attorney, Agent, or Firm* — Oblon, McClelland, Maier & Neustadt, L.L.P.

(57)                ABSTRACT

A sealing assembly for a torque converter includes a hub mounted on a drive shaft and having an axial extension portion, and a sealing member disposed between the axial extension portion of the hub and the drive shaft and arranged to seal a portion between the hub and the drive shaft. The hub further includes an inner radial extension portion extending from the axial extension portion toward the drive shaft, and the inner radial extension portion and the axial extension portion define an accommodation space for accommodating the sealing member. The above-mentioned sealing assembly can be included in a torque converter, and the torque converted can be included in a vehicle.

15 Claims, 6 Drawing Sheets

9

91

SEALING ASSEMBLY, HYDRAULIC TORQUE CONVERTER AND VEHICLE

CROSS-REFERENCE TO RELATED APPLICATION

This application claims priority to and the benefit of Chinese Patent Application No. 202410095981.6 filed in the Chinese Intellectual Property Office on Jan. 23, 2024 and Chinese Utility Model Application No. 202420170047.1 filed in the Chinese Intellectual Property Office on Jan. 23, 2024, the entire contents of which are incorporated herein by reference.

TECHNICAL FIELD

The present disclosure relates to a sealing assembly for a torque converter. In addition, the present disclosure relates to a torque converter including the sealing assembly, and a vehicle.

BACKGROUND ART

In general, a torque converter is installed between an engine and a transmission of an automatic transmission vehicle. The torque converter may serve to transmit torque by transmitting driving power of the engine to the transmission and convert the torque. The torque converter includes a cover configured to be operated by a driving member at an engine side, a pump wheel rotationally fixed and connected to the cover, a turbine, a damping elastic member, a driven disc, and a driven hub coupled to a drive shaft of the transmission. The torque converter may have two types of driving modes including a fluid driving mode and a machine driving mode, and the torque converter may switch between the two driving modes. In a step of turning on the vehicle, the torque converter operates in the fluid driving mode. In this case, the pump wheel of the torque converter transmits torque directly to the driven hub or transmits the torque through the driven disc by operating the turbine by using a fluid. When the engine reaches a higher rotational speed, the torque converter switches to the machine driving mode. In the machine driving mode, torque is mechanically transmitted from the cover to the driven hub via the damping elastic member and the driven disc through a piston disc.

The torque converter switches between the driving modes by operating the piston disc. The piston disc may be operated in an axial direction with respect to the drive shaft by an operation of a hydraulic fluid, such that the torque converter may switch between the driving modes. A sealing member is disposed between the piston disc and the drive shaft in order to prevent a leak of the hydraulic fluid between the piston disc and the drive shaft. In a vehicle driving system in the related art, a space for accommodating the sealing member is generally disposed in the drive shaft of the transmission. A groove is specially formed in the drive shaft, and the sealing member is accommodated in the groove, protrudes from the groove, and comes into contact with the piston disc, thereby implementing sealing. However, for this reason, the versatility of the torque converter deteriorates, and in particular, the torque converter cannot be applied to a transmission that does not have the groove formed in the drive shaft to accommodate the sealing member.

SUMMARY

Therefore, an object of the present disclosure is to solve the problems that the torque converter in the related art has and to provide a sealing assembly for a torque converter, the sealing assembly being capable of accommodating a sealing member without forming a groove in a drive shaft.

The above-mentioned object is implemented by a sealing assembly for a torque converter according to an embodiment of the present disclosure. The sealing assembly may include a hub mounted on a drive shaft and having an axial extension portion, and a sealing member disposed between the axial extension portion of the hub and the drive shaft and configured to seal a portion between the hub and the drive shaft. The hub may further include an inner radial extension portion extending from the axial extension portion toward the drive shaft, and the inner radial extension portion and the axial extension portion define an accommodation space for accommodating the sealing member.

One object of the present disclosure is to provide a sealing assembly that does not need to have a groove formed in the drive shaft to accommodate the sealing member. The hub of the sealing assembly according to the present disclosure may include an axial extension portion and an inner radial extension portion and have a space for accommodating the sealing member. Therefore, it is not necessary to form a groove in the drive shaft. Therefore, the torque converter equipped with the sealing assembly according to the present disclosure may have excellent versatility and particularly be suitably applied to a transmission having no groove formed in the drive shaft.

In addition, a radial displacement may occur between the hub and the drive shaft, such that the coaxiality between the hub and the drive shaft cannot be maintained, and the eccentricity occurs. When the eccentricity is excessively high, the sealing member between the hub and the drive shaft is excessively compressed, which shortens the lifespan. The inner radial extension portion of the hub may restrict the eccentricity between the axial extension portion of the hub and the drive shaft, such that the sealing member is not excessively compressed, and the usage lifespan may be prolonged.

The sealing assembly according to the present disclosure may further have one or more of the following features or combinations thereof.

According to the exemplary embodiment of the present disclosure, the hub may further include an outer radial extension portion extending from the axial extension portion in a direction away from the drive shaft. With the radial extension portion, the hub may load another member of the torque converter, such as a piston disc or a thrust washer.

According to the exemplary embodiment of the present disclosure, the outer radial extension portion and the inner radial extension portion are staggered from or overlap each other in the axial direction.

According to the exemplary embodiment of the present disclosure, a stepped portion may be installed on the outer radial extension portion, the stepped portion may include: a first radial extension surface; a second radial extension surface; and a circumferential surface configured to connect the first radial extension surface and the second radial extension surface, the first radial extension surface may be positioned radially inward of the circumferential surface, and the second radial extension surface may be positioned radially outward of the circumferential surface. In particular, the stepped portion may be used to load the thrust washer of the torque converter.

According to the exemplary embodiment of the present disclosure, the first radial extension surface may be placed on the same plane as the axial end surface of the hub. In other words, the first radial extension surface is defined by the axial end surface of the hub. Therefore, the hub has a simple structure and is more easy to manufacture.

According to the exemplary embodiment of the present disclosure, the inner radial extension portion is spaced apart from the axial end surface at a predetermined distance and defines an avoidance space. The avoidance space may prevent the axial end surface of the hub from coming into contact with an additional feature of the drive shaft, and the axial movement of the hub on the drive shaft may not be hindered.

According to the exemplary embodiment of the present disclosure, the inner radial extension portion and the outer radial extension portion are respectively positioned at two axial ends of the axial extension portion.

According to the exemplary embodiment of the present disclosure, the inner radial extension portion may be connected to the axial extension portion through a first bent portion, and/or the outer radial extension portion may be connected to the axial extension portion through a second bent portion. The hub having the structure may be advantageously formed by pressing and reduce manufacturing costs.

According to the exemplary embodiment of the present disclosure, the sealing member may be a dynamic sealing member and prevent damage to sealing between the hub and the drive shaft by allowing the sealing between the hub and the drive shaft to withstand a predetermined radial and/or axial displacement between the hub and the drive shaft.

According to the exemplary embodiment of the present disclosure, the sealing member may be a skeleton oil seal.

In addition, the present disclosure provides a torque converter including: the above-mentioned sealing assembly; a driven hub mounted on a drive shaft and fixed to the drive shaft in a circumferential direction; a piston disc fixed to the hub; and a thrust washer disposed between the driven hub and the piston disc in an axial direction.

According to the exemplary embodiment of the present disclosure, the piston disc may be press-fitted into the hub in an interference-fit manner, or the piston disc and the hub may be integrated.

According to the exemplary embodiment of the present disclosure, the hub may further include an outer radial extension portion extending from the axial extension portion in a direction away from the drive shaft, a first stepped portion may be installed on the outer radial extension portion, the first stepped portion may include: a first radial extension surface; a second radial extension surface; and a circumferential surface configured to connect the first radial extension surface and the second radial extension surface, the first radial extension surface may be positioned radially inward of the circumferential surface, the second radial extension surface may be positioned radially outward of the circumferential surface, and the thrust washer may be mounted on the circumferential surface of the first stepped portion. Therefore, a radial position of the thrust washer is fixed.

According to the exemplary embodiment of the present disclosure, the thrust washer is fixed to the driven hub.

According to the exemplary embodiment of the present disclosure, the thrust washer is joined to the driven hub.

According to the exemplary embodiment of the present disclosure, a fixing pin may be installed on the thrust washer, a fixing hole may be installed in the driven hub, and the fixing protrusion is inserted into the fixing hole, such that the thrust washer may be securely fixed to the driven hub.

According to the exemplary embodiment of the present disclosure, the fixing pin may be inserted into the fixing hole in an interference-fit manner.

In addition, the present disclosure provides a vehicle including the above-mentioned torque converter.

BRIEF DESCRIPTION OF THE DRAWINGS

The above and other features and advantages of the present disclosure will become clearer in the following detailed description of an exemplary embodiment, which is made with reference to the accompanying drawings, and the description and drawings are provided for illustrative purposes only and are not intended to limit the scope of the present disclosure in any way. The following drawings are not drawn to the same scale as the actual size and are focused on explaining the subject matter of the present disclosure.

Throughout the drawings, identical reference numerals indicate identical or similar members.

DETAILED DESCRIPTION

Figure 1:
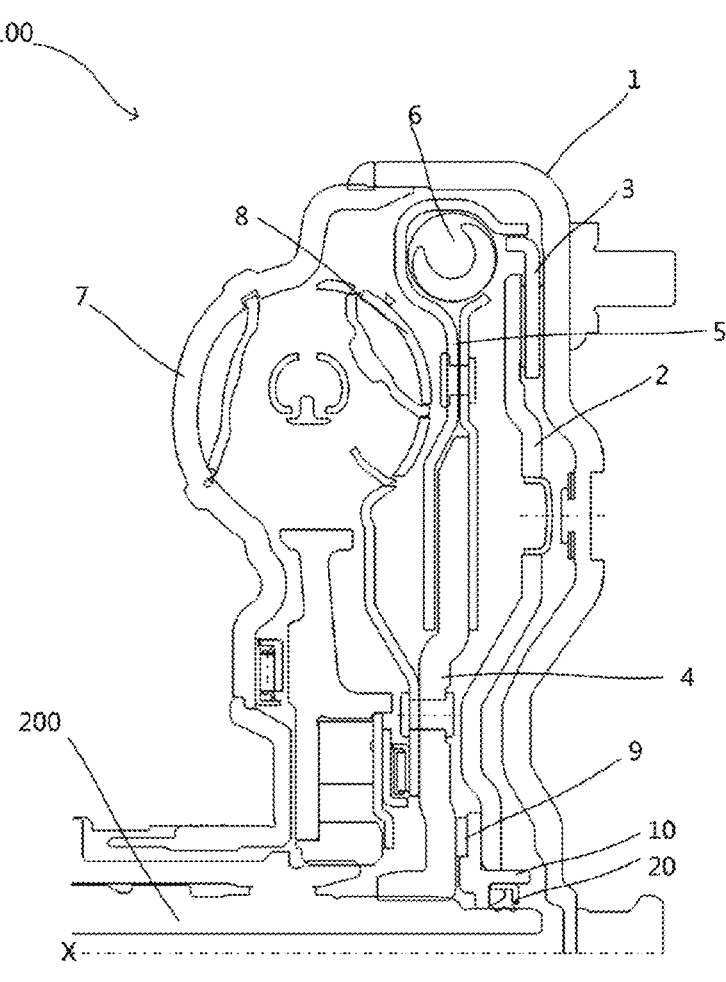
FIG. 1 is a partial cross-sectional view of a torque converter including a sealing assembly according to a first embodiment of the present disclosure.

Hereinafter, in order to clarify the purpose, technical solutions, and advantages of the embodiment of the present disclosure, the technical solutions of the embodiment of the present disclosure will be clearly and sufficiently described with reference to the drawings of the embodiment of the present disclosure. The described embodiment is only a part of the embodiments of the present disclosure and does not represent all embodiments.

Unless otherwise defined herein, technical terms or scientific terms used in the present specification should have the ordinary meaning understood by those skilled in the art to which the present disclosure pertains. Words such as "one," "one," or "corresponding" used in the patent application specification and the claims of the present disclosure do not indicate quantitative limitations, but indicate the presence of at least one. The terms "including," "having," and the like are used in the present disclosure to indicate the presence of the features, numbers, steps, operations, elements, members, or combinations thereof, but are not intended to exclude the presence or addition of one or more other features, numbers, steps, operations, elements, members, or combinations thereof. In addition, terms including ordinal numbers such as 'first' and 'second' may be used to describe various members, but these members are not limited by such terms, and such terms are merely used to distinguish one member from other members. For example, a first member may be named a second member, and likewise a second member may be named a first member, without departing from the scope of the present disclosure.

In the description of the present disclosure, the terms "upper," "lower," "left," "right," "inside," and "outside" are used merely to facilitate and simplify the description of the present disclosure, and do not indicate or imply that the device or element mentioned needs to have a specific orientation, be configured, or operate in a specific direction, and should not be understood as limiting the present disclosure in this regard. The directions, such as an "axial direction," a "radial direction," and a "circumferential direction", are defined based on a rotation axis X of a torque converter, the axial direction is a direction in which the rotation axis X extends, the radial direction is a direction perpendicular to the rotation axis X, and the circumferential direction is a circumferential direction defined based on the rotation axis X. The "circumferential angle" refers to an angle at which a member or a feature extends in the circumferential direction based on the rotation axis X.

Various embodiments according to the present disclosure will be described in detail with reference to the accompanying drawings. Here, the same reference numeral is assigned to the components that have substantially the same or similar structure and function in the drawings, and duplicate descriptions will be omitted.

FIG. 1 is a partial cross-sectional view of a torque converter 100 including a sealing assembly according to a first embodiment of the present disclosure. For clarity, various constituent elements of the structure of the torque converter (100) that are not relevant to understanding the technical solution of the present disclosure will be omitted.

As illustrated in FIG. 1, the torque converter 100 includes a cover 1, a piston disc 2, an intermediate disc 3 disposed between the cover 1 and the piston disc 2, a driven hub 4 fixed to a drive shaft 200 in the circumferential direction, a driven disc 5 fixed to the driven hub 4 in the circumferential direction, a damping elastic member 6 disposed between intermediate disc 3 and the driven disc 5, a pump wheel 7 fixedly connected to the cover 1 in the circumferential direction, and a turbine 8 fixed to the driven hub 4.

The torque converter 100 may transmit torque, which is inputted from the cover 1, to the drive shaft 200 in a machine driving mode or a fluid driving mode. In the machine driving mode, the piston disc 2 pushes the intermediate disc 3 by operating in the axial direction toward the cover 1 along the drive shaft 200 and rotates about the rotation axis X by being operated directly by the cover 1. The intermediate disc 3 operates the driven disc 5 by means of the damping elastic member 6 and additionally operates the drive shaft 200 by means of the driven hub 4. In the fluid driving mode, the piston disc 2 operates in the axial direction away from the cover 1 along the drive shaft 200 and prevents the intermediate disc 3 from coming into contact with the piston disc 2 and the cover 1, such that the cover 1 fluidly operates the turbine 8 by means of the pump wheel 7 without transmitting the torque directly to the intermediate disc 52 any further. In addition, the turbine 8 operates the drive shaft 200 by means of the driven hub 4.

The axial operation of the drive shaft piston disc 2 along the drive shaft 200 is performed by an operation of a hydraulic fluid. Specifically, both two opposite sides of the piston disc 2 may be filled with the hydraulic fluid. The piston disc 2 may be moved in the axial direction along the drive shaft 200 by a pressure difference between the hydraulic fluids at the two opposite sides of the piston disc 2. In order to maintain the pressure difference, a portion between the piston disc 2 and the drive shaft 200 needs to be necessarily sealed. To this end, the torque converter 100 includes a sealing assembly for providing the sealing between the piston disc 2 and the drive shaft 200.

Figure 2:
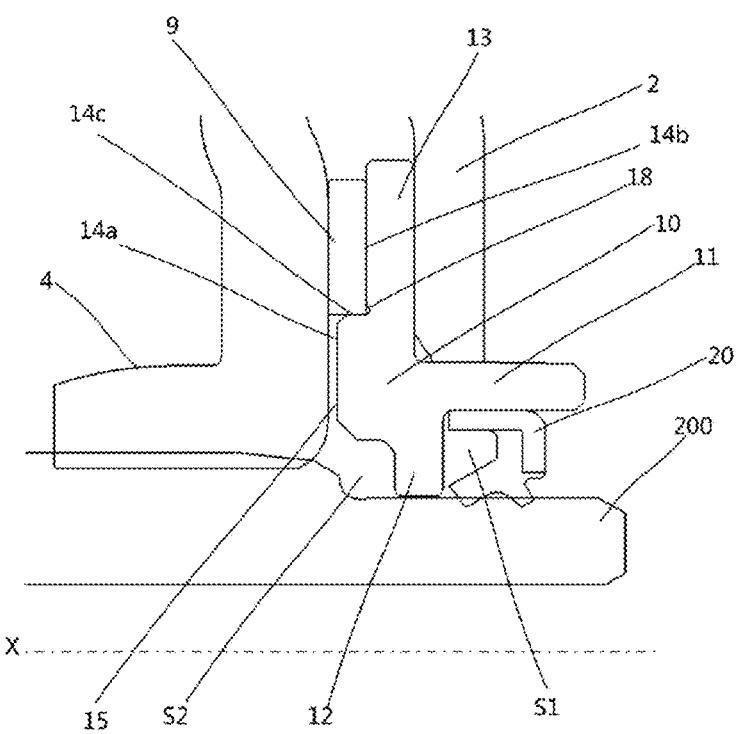
FIG. 2 is an enlarged view illustrating a part of FIG. 1 and illustrating the sealing assembly in detail.

FIG. 2 is an enlarged view illustrating a sealing assembly according to a first embodiment of the present disclosure in detail.

As illustrated in the drawings, the sealing assembly includes a hub 10 and a sealing member 20. The hub 10 is mounted on the drive shaft 200 and has an axial extension portion 11, an inner radial extension portion 12, and an outer radial extension portion 13. The inner radial extension portion 12 extends from the axial extension portion 11 toward the drive shaft 200, the outer radial extension portion 13 extends from the axial extension portion 11 in a direction away from the drive shaft 200, and the inner radial extension portion 12 and the outer radial extension portion 13 are staggered from each other at a predetermined interval in the axial direction. The piston disc 2 is press-fitted into the hub 10 in an interference-fit manner, an end surface of the piston disc 2 is in contact with the axial extension portion 11, and one side surface of the piston disc 2 is in contact with the outer radial extension portion 13. By the interference fit, the piston disc 2 is fixedly connected to the hub 10, and the portion between the piston disc 2 and the hub 10 is sealed. Therefore, in case that the piston disc 2 operates, the hub 10 moves along the piston disc 2. The sealing between the piston disc 2 and the drive shaft 200 is implemented by sealing between the hub 10 and the drive shaft 200.

The sealing between the hub 10 and the drive shaft 200 is implemented by the sealing member 20 disposed between the axial extension portion 11 and the drive shaft 200. The inner radial extension portion 12 and the axial extension portion 11 of the hub 10 defines an accommodation space S1. The sealing member 20 is accommodated in the accommodation space S1. Because the sealing member 20 is a dynamic sealing member such as a skeleton oil seal, the axial movement of the hub 10 along the drive shaft 200 does not damage the sealing between the two components, thereby meeting the sealing requirement of the operable piston disc 2. FIG. 2 illustrates that the sealing member 20 interferes with the drive shaft 200 to some extent in a radially inner side. This interference is merely schematic and illustrates a state in which the sealing member 20 is compressed in the accommodation space S1, but does not indicate that there is actual interference between the sealing member 20 and the drive shaft 200. The driven hub 4 mounted on the drive shaft 200 is illustrated as interfering with the drive shaft 200 to some extent. The interference means the connection, such as spline connection, in which the driven hub 4 is fixedly connected to the drive shaft 200 in the circumferential direction.

Because a radial displacement between the hub 10 and the drive shaft 200 may be caused by an internal or external vibration during the operation, the sealing member 20 between the hub 10 and the drive shaft 200 is compressed. The sealing member 20 may withstand compression to some extent, and the sealing member 20 may return to a state made before the sealing member 20 is compressed, such that the sealing member 20 does not damage the sealing between the hub 10 and the drive shaft 200. However, when the radial displacement between the hub 10 and the drive shaft 200 is excessively large, the sealing member 20 may be excessively pushed and cannot be restored, which may damage the sealing. The hub 10 according to the present disclosure reduces the interval between the hub 10 and the drive shaft 200 by means of the inner radial extension portion 12. When a large vibration is generated, the inner radial extension portion 12 comes into contact with the drive shaft 200 and protects the sealing member 20 so that the sealing member 20 is not excessively compressed.

A stepped portion 14 is installed on the outer radial extension portion 13 of the hub 10. The stepped portion 14 includes a first radial extension surface 14a, a second radial extension surface 14b, and a circumferential surface 14c configured to connect the first radial extension surface 14a and the second radial extension surface 14b. The first radial extension surface 14a is positioned radially inward of the circumferential surface 14c, and the second radial extension surface 14b is positioned radially outward of the circumferential surface 14c. The first radial extension surface 14a and an axial end surface 15 of the hub 10 are placed on the same plane. That is, the axial end surface 15 defines the first radial extension surface 14a. It can be seen that the first radial extension surface 14a and the axial end surface 15 may also be spaced apart from each other at a predetermined distance.

A thrust washer 9 may be mounted on the stepped portion 14 of the hub 10 and prevent the piston disc 2 from coming into contact with the driven hub 4 when the piston disc 2 operates while moving away from the cover 1. Specifically, the thrust washer 9 is mounted on the circumferential surface 14c and provided to be in contact with the second radial extension surface 14b. An avoidance groove 18 is formed in a connection portion between the second radial extension surface 14b and the circumferential surface 14c, such that the connection portion does not hinder the contact between the thrust washer 9 and the second radial extension surface 14b and between the thrust washer 9 and the circumferential surface 14c. The thrust washer 9 is disposed over the first radial extension surface 14a and the axial end surface 15 in the axial direction. The hub 10 does not come into contact with the driven hub 4 when the thrust washer 9 comes into contact with the driven hub 4 first in case that the piston disc 2 moves toward the driven hub 4. The thrust washer 9 may withstand a difference in rotational speed between the hub 10 and the driven hub 4, thereby preventing damage to the hub 10 and the driven hub 4.

In the embodiment illustrated in FIG. 2, the inner radial extension portion 12 and the outer radial extension portion 13 of the hub 10 are staggered from each other in the axial direction. The inner radial extension portion 12 is spaced apart from the axial end surface 15 at a predetermined distance and defines an avoidance space S2. The avoidance space S2 is spaced apart from the accommodation space S1 by means of the inner radial extension portion 12. When the piston disc 2 moves toward the driven hub 4, the avoidance space S2 may prevent the inner radial extension portion 12 from coming into contact with a structure on the drive shaft 200. It can be considered that the inner radial extension portion 12 and the outer radial extension portion 13 may also be disposed to be aligned with each other in the axial direction.

Figure 3:
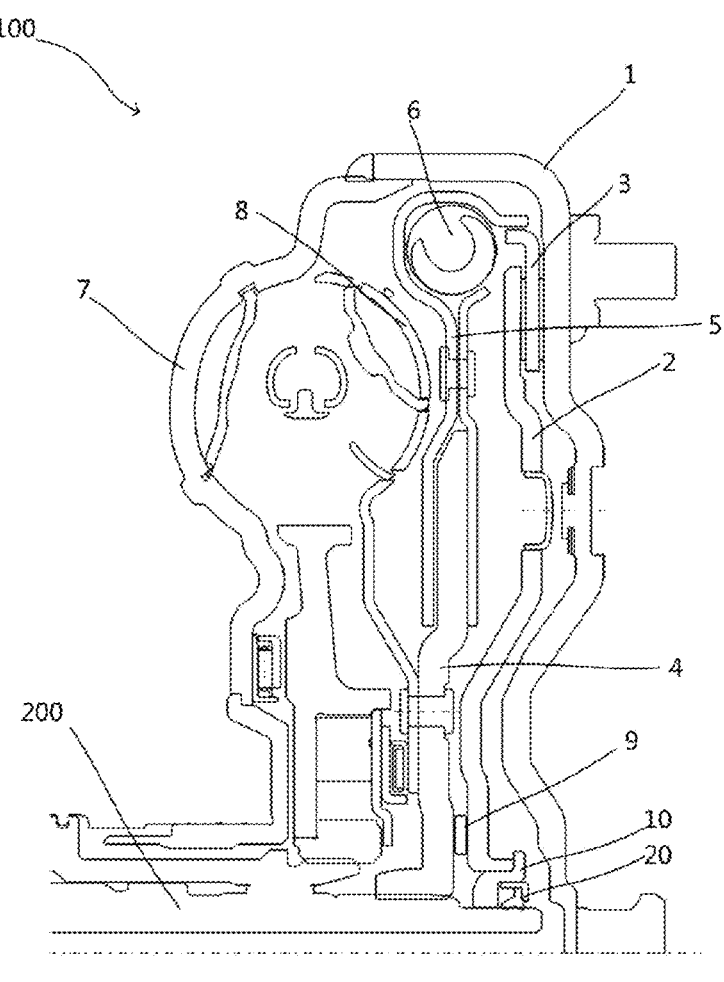
FIG. 3 is a partial cross-sectional view of a torque converter including a sealing assembly according to a second embodiment of the present disclosure.
Figure 4:
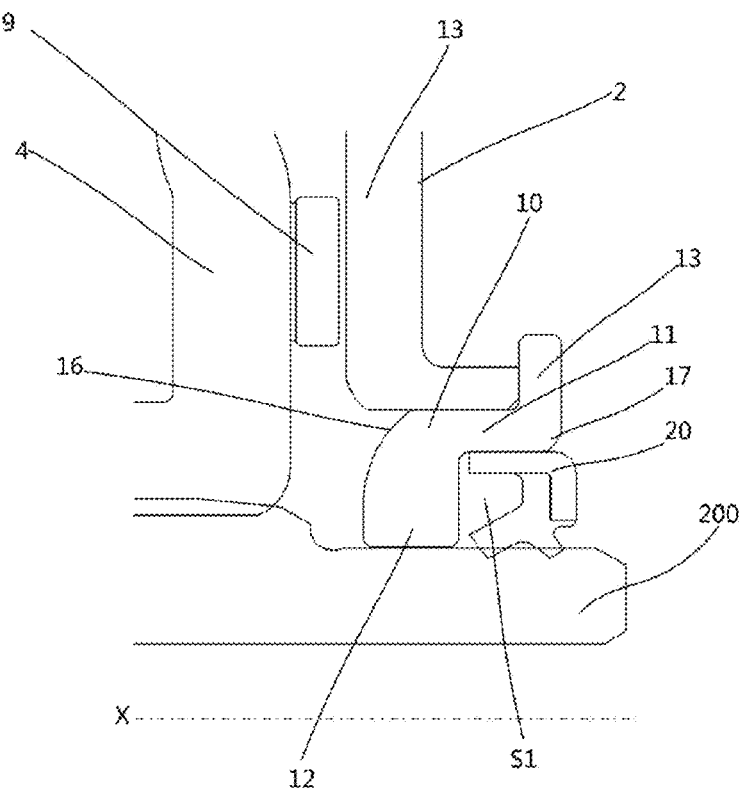
FIG. 4 is an enlarged view illustrating a part of FIG. 3 and illustrating the sealing assembly in detail.

FIG. 3 is a view illustrating a torque converter including a sealing assembly according to a second embodiment of the present disclosure, and FIG. 4 is an enlarged view illustrating the sealing assembly according to the second embodiment of the present disclosure. The torque converter illustrated in FIG. 3 has basically the same structure as the torque converter illustrated in FIG. 1. There is a difference in that the thrust washer 9 of the torque converter illustrated in FIG. 3 is fixed to the driven hub 4. As illustrated in FIG. 4, the thrust washer 9 may be joined to the driven hub 4 and made of a plastic material, such as a high-performance polyamide-imide plastic material, that is suitable to be joined to the driven hub 4.

The hub 10 of the sealing assembly according to the second embodiment of the present disclosure may have a simplified structure because it is not necessary to install the thrust washer. As illustrated in FIG. 4, likewise, the hub 10 has the axial extension portion 11, the inner radial extension portion 12, and the outer radial extension portion 13. The inner radial extension portion and the axial extension portion 11 define the accommodation space S1 for accommodating the sealing member 20. Unlike the first embodiment, the inner radial extension portion 12 and the outer radial extension portion 13 are provided at two axial ends of the axial extension portion 11 and respectively connected to the axial extension portion 11 through a first bent portion 16 and a second bent portion. With the above-mentioned structure, the hub 10 may be conveniently manufactured by pressing, which may reduce manufacturing difficulty and manufacturing costs.

Figure 5A:
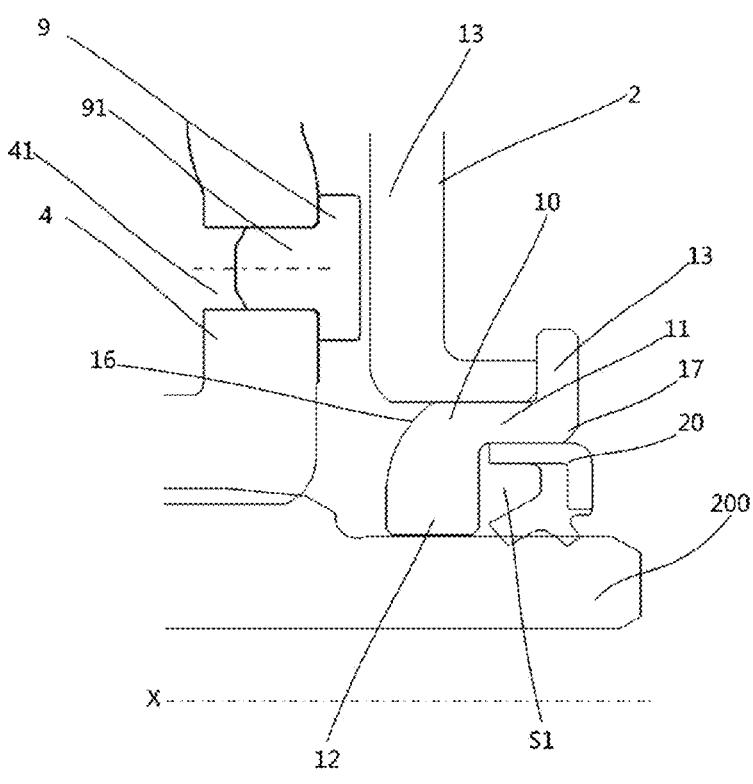
FIG. 5A is a partial cross-sectional view of another embodiment of the sealing assembly.
Figure 5B:
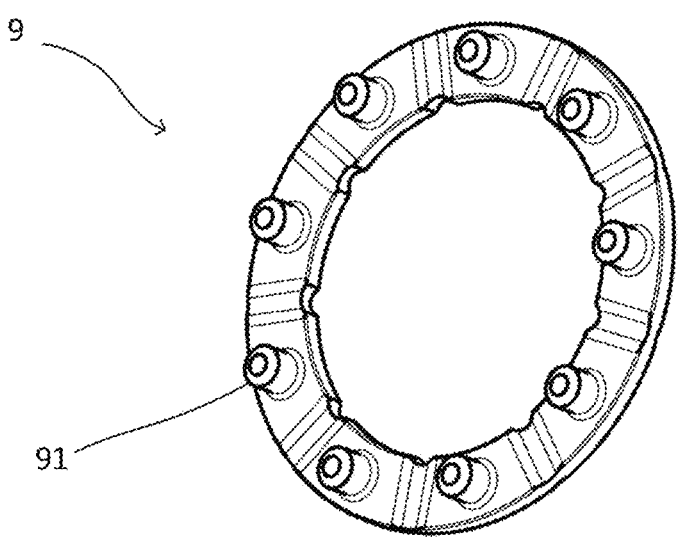
FIG. 5B is a view illustrating a thrust washer in the sealing assembly illustrated in FIG. 5A.

FIG. 5A illustrates another embodiment of the sealing assembly illustrated in FIG. 4. In this case, a mating feature for fixing the thrust washer 9 to the driven hub 4 is installed on the thrust washer 9. Specifically, with reference to FIG. 5B, one or more fixing pins 91 are installed on the thrust washer 9. Correspondingly, one or more fixing holes 42 are formed in the driven hub 4. When the thrust washer 9 is fixed, the fixing pin 91 is inserted into the fixing hole 42, such that the thrust washer 9 is securely fixed to the driven hub 4. Particularly, the fixing pin 91 is inserted into the fixing hole 42 in an interference-fit manner in order to improve the effect of fixing the thrust washer 9 and the driven hub 4. In addition, axial pressure in the torque converter 100 is applied to push the thrust washer 9 toward the driven hub 4, thereby more securely fixing the thrust washer 9 and the driven hub 4. Particularly, a plurality of fixing pins 91 (e.g., nine fixing pins) are provided on the thrust washer 9, and a plurality of fixing holes 42 (e.g., nine fixing holes) are correspondingly provided in the driven hub 4. Shear stress, which is generated by friction between the thrust washer 9 and the driven hub 4, may be distributed onto the plurality of fixing pins 91. Therefore, it is possible to reduce strength required for the fixing pin 91. The thrust washer 9 may be made of a high-strength material with wear resistance and high-temperature resistance such as polyether ether ketone (PEEK) or Teflon. It should be understood that another method of fixing the thrust washer 9 and the driven hub 4 may be considered in addition to the embodiments illustrated in FIGS. 4, 5A, and 5B.

Likewise, the piston disc 2 is also press-fitted into the hub 10 in an interference-fit manner. In the present embodiment, a flange is provided at a radially inner side of the piston disc 2. The flange is in contact with the axial extension portion 11 and the outer radial extension portion 13 of the hub 10 and seals, fixes, and connects the piston disc 2 to the hub 10. Selectively, the piston disc 2 may be sealed and fixed to the hub 10 by welding.

In addition, although not illustrated in the drawings, the piston disc 2 may be integrated with the hub 10.

In addition, the embodiment of the present disclosure provides a vehicle including the above-mentioned torque converter.

It should be understood that the structures described above and illustrated in the accompanying drawings are merely examples of the present disclosure and may be replaced with other structures that perform the same or similar functions to achieve the desired final result. It should also be understood that the embodiments described above and illustrated in the drawings are to be considered only as constituting non-limiting examples of the present disclosure and that the embodiments can be modified in various ways within the scope of the claims.

What is claimed is:

1. A sealing assembly for a torque converter, the sealing assembly comprising:

a hub mounted on a drive shaft and having an axial extension portion; and a sealing member disposed between the axial extension portion of the hub and the drive shaft and configured to seal a portion between the hub and the drive shaft, wherein the hub further comprises an inner radial extension portion extending from a first end of the axial extension portion toward the drive shaft, wherein the inner radial extension portion and the axial extension portion define an accommodation space for accommodating the sealing member, wherein the hub further comprises an outer radial extension portion extending from a second end of the axial extension portion in a direction away from the drive shaft, the second end of the axial extension portion being opposite to the first end in an axial direction.

2. The sealing assembly of claim 1, wherein a stepped portion is installed on the outer radial extension portion, wherein the stepped portion comprises:

a first radial extension surface;

a second radial extension surface; and a circumferential surface configured to connect the first radial extension surface and the second radial extension surface, wherein the first radial extension surface is positioned radially inward of the circumferential surface, and wherein the second radial extension surface is positioned radially outward of the circumferential surface.

3. The sealing assembly of claim 1, wherein the inner radial extension portion is connected to the axial extension portion through a first bent portion, and/or the outer radial extension portion is connected to the axial extension portion through a second bent portion.

4. The sealing assembly of claim 1, wherein the sealing member is a dynamic sealing member and prevents damage to sealing between the hub and the drive shaft by allowing the sealing between the hub and the drive shaft to withstand a predetermined radial and/or axial displacement between the hub and the drive shaft.

5. The sealing assembly of claim 4, wherein the sealing member is a skeleton oil seal.

6. A sealing assembly for a torque converter, the sealing assembly comprising:

a hub mounted on a drive shaft and having an axial extension portion; and a sealing member disposed between the axial extension portion of the hub and the drive shaft and configured to seal a portion between the hub and the drive shaft, wherein the hub further comprises an inner radial extension portion extending from the axial extension portion toward the drive shaft, wherein the inner radial extension portion and the axial extension portion define an accommodation space for accommodating the sealing member, wherein the hub further comprises an outer radial extension portion extending from the axial extension portion in a direction away from the drive shaft, wherein a stepped portion is installed on the outer radial extension portion, wherein the stepped portion comprises:

a first radial extension surface;

a second radial extension surface; and a circumferential surface configured to connect the first radial extension surface and the second radial extension surface, wherein the first radial extension surface is positioned radially inward of the circumferential surface, wherein the second radial extension surface is positioned radially outward of the circumferential surface, and wherein the first radial extension surface is placed on the same plane as an axial end surface of the hub.

7. The sealing assembly of claim 6, wherein the inner radial extension portion is spaced apart from the axial end surface at a predetermined distance and defines an avoidance space.

8. A torque converter comprising:

a sealing assembly comprising a hub mounted on a drive shaft and having an axial extension portion and a sealing member disposed between the axial extension portion of the hub and the drive shaft and configured to seal a portion between the hub and the drive shaft, wherein the hub further comprises an inner radial extension portion extending from the axial extension portion toward the drive shaft, and the inner radial extension portion and the axial extension portion define an accommodation space for accommodating the sealing member;

a driven hub mounted on the drive shaft and fixed to the drive shaft in a circumferential direction;

a piston disc fixed to the hub; and a thrust washer disposed between the driven hub and the piston disc in an axial direction.

9. The torque converter of claim 8, wherein the piston disc is press-fitted into the hub in an interference-fit manner, or the piston disc and the hub are integrated.

10. The torque converter of claim 8, wherein the hub further comprises an outer radial extension portion extending from the axial extension portion in a direction away from the drive shaft, wherein a stepped portion is installed on the outer radial extension portion, wherein the stepped portion comprises:

a first radial extension surface;

a second radial extension surface; and a circumferential surface configured to connect the first radial extension surface and the second radial extension surface, wherein the first radial extension surface is positioned radially inward of the circumferential surface, wherein the second radial extension surface is positioned radially outward of the circumferential surface, and wherein the thrust washer is mounted on the circumferential surface of the stepped portion.

11. The torque converter of claim 10, wherein the thrust washer is fixed to the driven hub.

12. The torque converter of claim 8, wherein the thrust washer is fixed to the driven hub.

13. The torque converter of claim 12, wherein one or more fixing pins are installed on the thrust washer, one or more fixing holes are installed in the driven hub, and the fixing pin is inserted into the fixing hole such that the thrust washer is securely fixed to the driven hub.

14. The torque converter of claim 13, wherein the fixing pin is inserted into the fixing hole in an interference-fit manner.

15. A vehicle comprising:

the torque converter according to claim 8.

* * * * *